US011961465B2

United States Patent
(12) United States Patent
Chun et al.

(10) Patent No.: US 11,961,465 B2
(45) Date of Patent: Apr. 16, 2024

(54) ORGANIC LIGHT EMITTING DIODE DISPLAY DEVICE

(71) Applicant: LG ELECTRONICS INC., Seoul (KR)

(72) Inventors: Youngho Chun, Seoul (KR); Seungkyu Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 435 days.

(21) Appl. No.: 17/286,796

(22) PCT Filed: Mar. 29, 2019

(86) PCT No.: PCT/KR2019/003712
§ 371 (c)(1),
(2) Date: Apr. 19, 2021

(87) PCT Pub. No.: WO2020/130233
PCT Pub. Date: Jun. 25, 2020

(65) Prior Publication Data

US 2021/0366375 A1 Nov. 25, 2021

(30) Foreign Application Priority Data

Dec. 19, 2018 (WO) ................ PCT/KR2018/016259

(51) Int. Cl.
*G09G 3/32* (2016.01)
*G09G 3/3208* (2016.01)

(52) U.S. Cl.
CPC ....... *G09G 3/3208* (2013.01); *G09G 2310/08* (2013.01); *G09G 2320/0626* (2013.01); *G09G 2360/12* (2013.01)

(58) Field of Classification Search
None
See application file for complete search history.

(56) References Cited

U.S. PATENT DOCUMENTS

2006/0221014 A1* 10/2006 Park .................... G09G 3/3233 345/77
2018/0348919 A1* 12/2018 Oh .................... H04N 21/4122

FOREIGN PATENT DOCUMENTS

JP 2006323102 11/2006
KR 100678204 2/2007
(Continued)

OTHER PUBLICATIONS

Akihiko, "Machine translated Japanese Patent publication: JP 2006323102", 2006 (Year: 2006).*
(Continued)

*Primary Examiner* — Tapas Mazumder
(74) *Attorney, Agent, or Firm* — LEE, HONG, DEGERMAN, KANG & WAIMEY

(57) ABSTRACT

The present disclosure relates to an organic light emitting diode display device capable of changing a frame size. The organic light emitting diode display device includes: a display including a panel, a frame memory configured to store image data in units of frames, and a timing controller configured to control the panel to display an image based on the image data stored in the frame memory; a memory configured to store information of the panel; and a controller configured to, when operating in a preset image mode, change a frame size, which is a size of the image data stored in the frame memory, based on the information of the panel.

8 Claims, 12 Drawing Sheets

(56) References Cited

FOREIGN PATENT DOCUMENTS

| | | |
|---|---|---|
| KR | 100707632 | 4/2007 |
| KR | 100855023 | 8/2008 |
| KR | 101644422 | 8/2016 |

OTHER PUBLICATIONS

PCT International Application No. PCT/KR2019/003712, International Search Report dated Sep. 24, 2019, 3 pages.

PCT International Application No. PCT/KR2018/016259, International Search Report dated Sep. 24, 2019, 3 pages.

* cited by examiner

| | | | |
|---|---|---|---|
| 110 | 101 | 000 | 110 |
| 111 | 010 | 010 | 111 |
| 110 | 001 | 110 | 111 |
| 011 | 110 | 011 | 111 |

ORGANIC LIGHT EMITTING DIODE DISPLAY DEVICE

CROSS-REFERENCE TO RELATED APPLICATIONS

This application is the National Stage filing under 35 U.S.C. 371 of International Application No. PCT/KR2019/003712, filed on Mar. 29, 2019, which claims the benefit of earlier filing date and right of priority to International Application No. PCT/KR2018/016259, filed on Dec. 19, 2018, the contents of which are all hereby incorporated by reference herein in their entirety.

TECHNICAL FIELD

The present disclosure relates to an organic light emitting diode display device, and more particularly, to an organic light emitting diode display device including a frame memory.

BACKGROUND ART

In recent years, the types of display devices have been diversified. Among them, an organic light emitting diode (OLED) display device is widely used.

Since the OLED display device is a self-luminous device, the OLED display device has lower power consumption and can be made thinner than a liquid crystal display (LCD) requiring a backlight. In addition, the OLED display device has a wide viewing angle and a fast response time.

In a general OLED display device, red, green, and blue sub-pixels constitute one unit pixel and an image having various colors may be displayed through the three subpixel s.

The OLED display device may display an image while outputting a plurality of frames per second. The frame may refer to a still image of each scene that implements a continuous image. For example, the OLED display device may display an image while outputting 30 frames or 60 frames or more per second.

To this end, the OLED display device may include a frame memory that stores image data in units of frames.

The frame memory may store image data frame by frame, and the OLED display device may output frames after analyzing the image data stored in the frame memory. At this time, in the case of outputting an image requiring real-time calculation, such as a game, the time required for frame analysis may increase, and thus image output may be delayed.

DISCLOSURE OF THE INVENTION

Technical Problem

The present disclosure provides an organic light emitting diode (OLED) display device capable of changing a frame size, which is a size of image data to be stored in a frame memory.

Technical Solution

An organic light emitting diode display device according to an embodiment of this present application comprises a display comprising a panel, a frame memory configured to store image data in units of frames, and a timing controller configured to control the panel to display an image based on the image data stored in the frame memory, a memory configured to store information of the panel, and a controller configured to, when operating in a preset image mode, change a frame size, which is a size of the image data stored in the frame memory, based on the information of the panel.

The controller is configured to change the frame size to 1 frame or less according to the information of the panel.

The controller is configured to change the frame size to one of 1 frame, ½ frame, ¼ frame, and ⅛ frame according to the information of the panel.

The information of the panel includes a screen size, and the controller is configured to set the frame size when the screen size is a first size to be larger than the frame size when the screen size is a second size smaller than the first size.

The image mode includes an image mode in which the frame size is fixed, and an image mode in which the frame size is variable.

The image mode in which the frame size is variable includes a game mode.

The controller is configured to set the frame size differently according to a type of the image mode.

The controller is configured to set an image luminance to a first luminance when the frame size is a first frame, and set the image luminance to a second luminance higher than the first luminance when the frame size is a second frame larger than the first frame.

When it is determined that an error has occurred in output image in a state in which the frame size is the first frame, the controller is configured to increase the frame size from the first frame to the second frame.

When the first luminance is lower than a reference luminance, the controller is configured to increase the frame size from the first frame to the second frame.

Advantageous Effects

According to embodiments of the present disclosure, the time required for frame analysis may be reduced by changing the frame size when the OLED display device operates in the preset image mode. In this case, there is an advantage of improving the image output speed.

In addition, there is an advantage of minimizing the occurrence of error during image output by changing the luminance when the frame size is changed.

In addition, the frame size may be set differently based on at least one of information on a panel, a type of image mode, and a luminance. In this case, there is an advantage that the output speed can be adjusted considering various factors such as panel, image, and luminance.

MODE FOR CARRYING OUT THE INVENTION

Hereinafter, the present invention will be described in detail with reference to the drawings.

The suffixes "module" and "unit" for components used in the description below are assigned or mixed in consideration of easiness in writing the specification and do not have distinctive meanings or roles by themselves.

Figure 1:
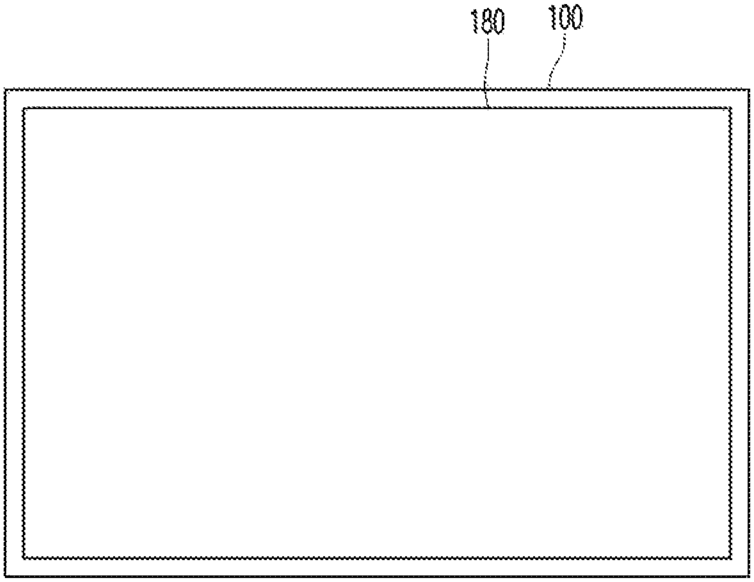
FIG. 1 is a diagram illustrating an image display apparatus according to an embodiment of the present invention.

FIG. 1 is a diagram illustrating an image display apparatus according to an embodiment of the present invention.

With reference to the drawings, an image display apparatus 100 includes a display 180.

On the other hand, the display 180 is realized by one among various panels. For example, the display 180 is one of the following panels: a liquid crystal display panel (LCD panel), an organic light-emitting diode (OLED) panel (OLED panel), and an inorganic light-emitting diode (OLED) panel (ILED panel).

According to the present invention, the display 180 is assumed to include an organic light-emitting diode (OLED) panel (OLED).

On the other hand, examples of the image display apparatus 100 in FIG. 1 include a monitor, a TV, a tablet PC, a mobile terminal, and so on.

Figure 2:
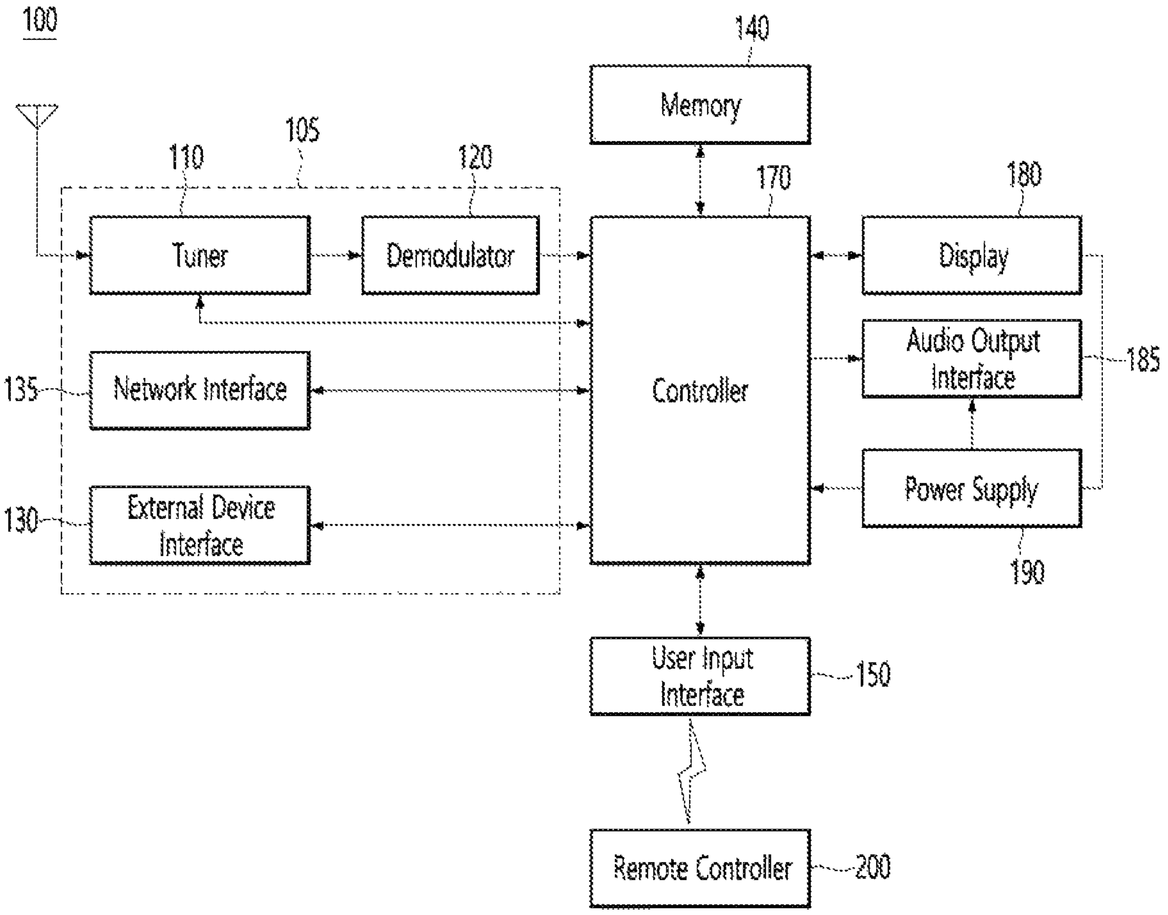
FIG. 2 is an example of a block diagram of the inside of the image display apparatus in FIG. 1.

FIG. 2 is an example of a block diagram of the inside of the image display apparatus in FIG. 1.

With reference to FIG. 2, the image display apparatus 100 according to an embodiment of the present invention includes a broadcast receiver 105, an external device interface 130, a memory 140, a user input interface 150, a sensor module (not illustrated), a controller 170, a display 180, an audio output interface 185, and a power supply 190.

The broadcast receiver 105 includes a tuner 110, a demodulator 120, a network interface 135, and an external device interface 130.

On the other hand, unlike in the drawings, it is also possible that the broadcast receiver 105 only includes the tuner 110, the demodulator 120, and the external device interface 130. That is, the network interface 135 may not be included.

The tuner 110 selects a radio frequency (RF) broadcast signal that corresponds to a channel which is selected by a user, or RF broadcast signals that correspond to all channels that are already stored, among RF broadcast signals that are received through an antenna (not illustrated). In addition, the selected RF broadcast signal is converted into an intermediate frequency signal, a baseband image, or an audio signal.

For example, the selected RF broadcast signal, if is a digital broadcast signal, is converted into a digital IF (DIF) signal, and, if is an analog broadcast signal, is converted into an analog baseband image or an audio signal (CVBS/SIF). That is, the tuner 110 processes a digital broadcast signal or an analog broadcast signal. The analog baseband image or the audio signal (CVBS/SIF) output from the tuner 110 is input directly into the controller 170.

On the other hand, the tuner 110 possibly includes a plurality of tuners in order to receive broadcast signals in a plurality of channels. In addition, it is also possible that a signal tuner that receives the broadcast signals in the plurality of channels at the same time is included.

The demodulator 120 receives a digital IF(DIF) signal that results from the conversion in the tuner 110 and performs a demodulation operation on the received digital IF signal.

The demodulator 120 performs demodulation and channel decoding, and then outputs a stream signal (TS). At this time, the stream signal is a signal that results from multiplexing image signals, audio signals, or data signals.

The stream signal output from the demodulator 120 is input into the controller 170. The controller 170 performs demultiplexing, video and audio signal processing, and so on, and then outputs the resulting image to the display 180 and outputs the resulting audio to the audio output interface 185.

The external device interface 130 transmits or receives data to and from an external apparatus (not illustrated) connected, for example, a set-top box. To do this, the external device interface 130 includes an A/V input and output interface (not illustrated).

The external device interface 130 is connected in a wired or wireless manner to an external apparatus, such as a digital versatile disc (DVD), a Blu-ray disc, a game device, a camera, a camcorder, a computer (a notebook computer), or a set-top box, and may perform inputting and outputting operations for reception and transmission of data to and from the external apparatus.

An image and an audio signal of the external apparatus are input into the A/V input and output interface. On the other hand, a wireless communication module (not illustrated) performs a short-distance wireless communication with a different electronic apparatus.

Through the wireless communication module (not illustrated), the external device interface 130 transmits and receives data to and from the nearby mobile terminal (not illustrated). Particularly, in a mirroring mode, the external device interface 130 receives device information, information on an application executed, an application image, and so on from the mobile terminal 600.

The network interface 135 provides an interface for connecting the image display apparatus 100 to wired and wireless networks including the Internet. For example, the network interface 135 receives items of content or pieces of data pieces that are provided by a content provider or a network operator through a network or the Internet.

On the other hand, the network interface 135 includes the wireless communication module (not illustrated).

A program for controlling processing or control of each signal within the controller 170 may be stored in the memory 140. An image signal, an audio signal, or a data signal, which results from signal processing, may be stored in the memory 140.

In addition, an image signal, an audio signal, or a data signal, which is input into the external device interface 130, may be temporarily stored in the memory 140. In addition, information on a predetermined broadcast channel may be stored in the memory 140 through a channel storage function such as a channel map.

An embodiment in which the memory 140 is provided separately from the controller 170 is illustrated in FIG. 2, but the scope of the present invention is not limited to this. The memory 140 is included within the controller 170.

The user input interface 150 transfers a signal input by the user, to the controller 170, or transfers a signal from the controller 170 to the user.

For example, user input signals, such as power-on and -off signals, a channel selection signal, and a screen setting signal, are transmitted and received to and from a remote controller 200, user input signals that are input from local keys (not illustrated), such as a power key, a channel key, a volume key, and a setting key, are transferred to the controller 170, a user input signal input from the sensor module (not illustrated) that senses a user's gesture is transferred to the controller 170, or a signal from the controller 170 is transmitted to the sensor module (not illustrated).

The controller 170 demultiplexes a stream input through the tuner 110, the demodulator 120, the network interface 135, the external device interface 130, or processes signals that results from demultiplexing, and thus generates and outputs a signal for outputting an image and audio.

An image signal that results from image-processing in the controller 170 is input into the display 180, and an image that corresponds to the image signal is displayed. In addition, the image signal that results from the image-processing in the controller 170 is input into an external output apparatus through the external device interface 130.

An audio signal that results from processing in the controller 170 is output, as audio, to the audio output interface 185. In addition, an audio signal that results from processing in the controller 170 is input into an external output apparatus through the external device interface 130.

Although not illustrated in FIG. 2, the controller 170 includes a demultiplexer, an image processor, and so on. The details of this will be described below with reference to FIG. 3.

In addition, the controller 170 controls an overall operation within the image display apparatus 100. For example, the controller 170 controls the tuner 110 in such a manner that the tuner 110 performs selection of (tuning to) a RF broadcast that corresponds to a channel selected by the user or a channel already stored.

In addition, the controller 170 controls the image display apparatus 100 using a user command input through the user input interface 150, or an internal program.

On the other hand, the controller 170 controls the display 180 in such a manner that an image is displayed. At this time, the image displayed on the display 180 is a still image, or a moving image, and is a 2D image or a 3D image.

On the other hand, the controller 170 is configured to a predetermined object is displayed within the image displayed on the display 180. For example, the object is at least one of the following: a web screen (a newspaper, a magazine, or so on) connected, an electronic program guide (EPG), various menus, a widget, an icon, a still image, a moving image, and text.

On the other hand, the controller 170 recognizes a location of the user, based on an image captured by an imaging module (not illustrated). For example, a distance (a z-axis coordinate) between the user and the image display apparatus 100 is measured. In addition, a x-axis coordinate and a y-axis coordinate within the display 180, which correspond to the location of the user are calculated.

The display 180 converts an image signal, a data signal, an OSD signal, a control signal that result from the processing in the controller 170, or an image signal, a data signal, a control signal, and so on that are received in the external device interface 130, and generates a drive signal.

On the other hand, the display 180 is configured with a touch screen, and thus is also possibly used as an input device, in addition to an output device.

The audio output interface 185 receives a signal that results from audio processing the controller 170, as an input, and outputs the signal, as audio.

The imaging module (not illustrated) captures an image of the user. The imaging module (not illustrated) is realized as one camera, but is not limited to the one camera. It is also possible that the imaging module is realized as a plurality of cameras. Information of an image captured by the imaging module (not illustrated) is input into the controller 170.

Based on the image captured by the imaging module (not illustrated), or on an individual signal detected by the sensor module (not illustrated) or a combination of the detected individual signals, the controller 170 detects the user's gesture.

A power supply 190 supplies required powers to the entire image display apparatus 100. Particularly, a power is supplied to the controller 170 realized in the form of a system-on-chip (SOC), the display 180 for image display, the audio output interface 185 for audio output, and so on.

Specifically, the power supply 190 includes a converter that converts an alternating current power into a direct current power, and a dc/dc converter that converts a level of the direct current power.

The remote controller 200 transmits a user input to the user input interface 150. To do this, the remote controller 200 employs Bluetooth, radio frequency (RF) communication, infrared (IR) communication, ultra-wideband (UWB), a ZigBee specification, and so on. In addition, the remote controller 200 receives an image signal, an audio signal, or a data signal output from the user input interface 150, and displays the received signal on a display of the remote controller 200 or outputs the received signal, as audio, to an output interface of the remote controller 200.

On the other hand, the image display apparatus 100 described above is a digital broadcast receiver that possibly receives a fixed-type or mobile-type digital broadcast.

On the other hand, a block diagram of the image display apparatus 100 illustrated in FIG. 2 is a block diagram for an embodiment of the present invention. Each constituent element in the block diagram is subject to integration, addition, or omission according to specifications of the image display apparatus 100 actually realized. That is, two or more constituent elements are to be integrated into one constituent element, or one constituent element is to be divided into two or more constituent elements. In addition, a function performed in each block is for description of an embodiment of the present invention, and specific operation of each constituent element imposes no limitation to the scope of the present invention.

Figure 3:
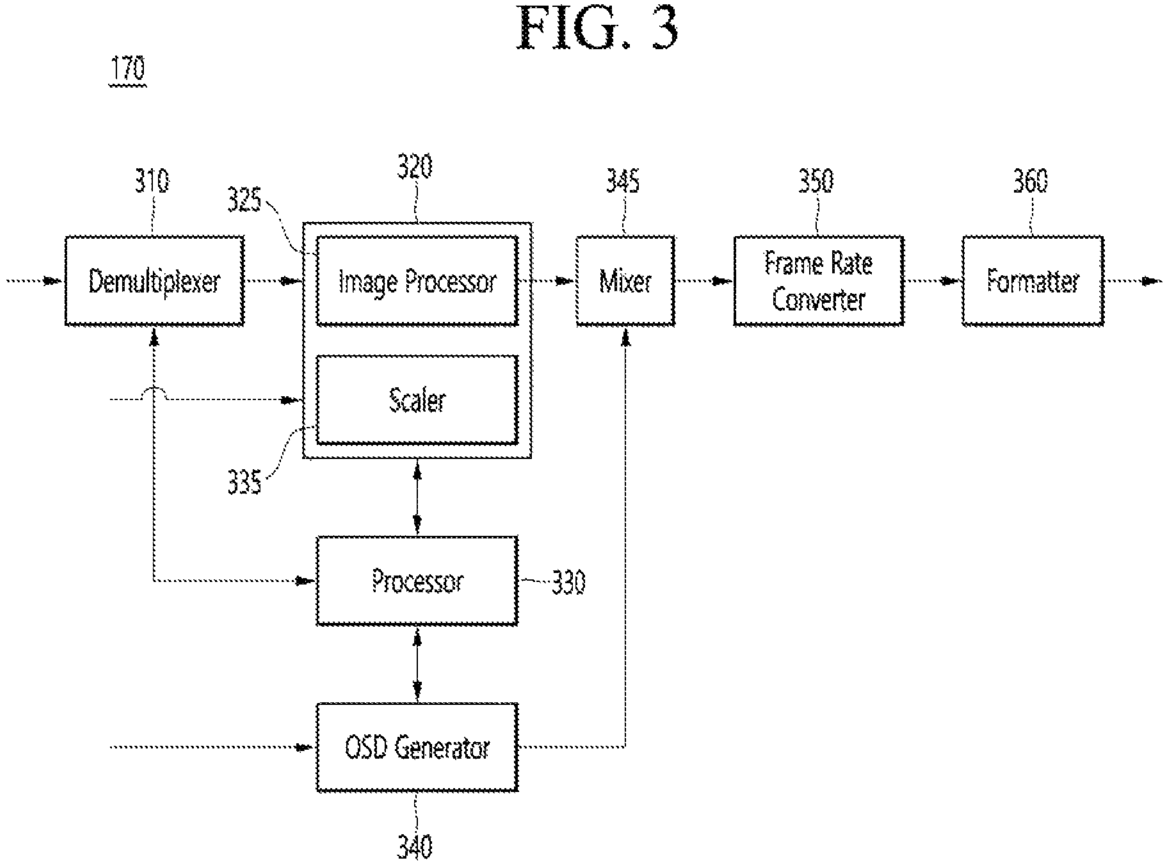
FIG. 3 is an example of a block diagram of the inside of a controller in FIG. 2.

FIG. 3 is an example of a block diagram of the inside of a controller in FIG. 2.

For description with reference to the drawings, the controller 170 according to an embodiment of the present invention includes a demultiplexer 310, an image processor 320, a processor 330, an OSD generator 340, a mixer 345, a frame rate converter 350, and a formatter 360. In addition, an audio processor (not illustrated) and a data processor (not illustrated) are further included.

The demultiplexer 310 demultiplexes a stream input. For example, in a case where an MPEG-2 TS is input, the MPEG-2 TS is demultiplexed into an image signal, an audio signal, and a data signal. At this point, a stream signal input into the demultiplexer 310 is a stream signal output from the tuner 110, the demodulator 120, or the external device interface 130.

The image processor 320 performs image processing of the image signal that results from the demultiplexing. To do this, the image processor 320 includes an image decoder 325 or a scaler 335.

The image decoder 325 decodes the image signal that results from the demultiplexing. The scaler 335 performs scaling in such a manner that a resolution of an image signal which results from the decoding is such that the image signal is possibly output to the display 180.

Examples of the image decoder 325 possibly include decoders in compliance with various specifications. For example, the examples of the image decoder 325 include a decoder for MPEG-2, a decoder for H.264, a 3D image decoder for a color image and a depth image, a decoder for a multi-point image, and so on.

The processor 330 controls an overall operation within the image display apparatus 100 or within the controller 170. For example, the processor 330 controls the tuner 110 in such a manner that the tuner 110 performs the selection of (tuning to) the RF broadcast that corresponds to the channel selected by the user or the channel already stored.

In addition, the processor 330 controls the image display apparatus 100 using the user command input through the user input interface 150, or the internal program.

In addition, the processor 330 performs control of transfer of data to and from the network interface 135 or the external device interface 130.

In addition, the processor 330 controls operation of each of the demultiplexer 310, the image processor 320, the OSD generator 340, and so on within the controller 170.

The OSD generator 340 generates an OSD signal, according to the user input or by itself. For example, based on the user input signal, a signal is generated for displaying various pieces of information in a graphic or text format on a screen of the display 180. The OSD signal generated includes various pieces of data for a user interface screen of the image display apparatus 100, various menu screens, a widget, an icon, and so on. In addition, the OSD generated signal includes a 2D object or a 3D object.

In addition, based on a pointing signal input from the remote controller 200, the OSD generator 340 generates a pointer possibly displayed on the display. Particularly, the pointer is generated in a pointing signal processor, and an OSD generator 340 includes the pointing signal processor (not illustrated). Of course, it is also possible that instead of being providing within the OSD generator 340, the pointing signal processor (not illustrated) is provided separately.

The mixer 345 mixes the OSD signal generated in the OSD generator 340, and the image signal that results from the image processing and the decoding in the image processor 320. An image signal that results from the mixing is provided to the frame rate converter 350.

The frame rate converter (FRC) 350 converts a frame rate of an image input. On the other hand, it is also possible that the frame rate converter 350 outputs the image, as is, without separately converting the frame rate thereof.

On the other hand, the formatter 360 converts a format of the image signal input, into a format for an image signal to be displayed on the display, and outputs an image that results from the conversion of the format thereof.

The formatter 360 changes the format of the image signal. For example, a format of a 3D image signal is changed to any one of the following various 3D formats: a side-by-side format, a top and down format, a frame sequential format, an interlaced format, and a checker box format.

On the other hand, the audio processor (not illustrated) within the controller 170 performs audio processing of an audio signal that results from the demultiplexing. To do this, the audio processor (not illustrated) includes various decoders.

In addition, the audio processor (not illustrated) within the controller 170 performs processing for base, treble, volume adjustment and so on.

The data processor (not illustrated) within the controller 170 performs data processing of a data signal that results from the demultiplexing. For example, in a case where a data signal that results from the demultiplexing is a data signal the results from coding, the data signal is decoded. The data signal that results from the coding is an electronic program guide that includes pieces of broadcast information, such as a starting time and an ending time for a broadcast program that will be telecast in each channel.

On the other hand, a block diagram of the controller 170 illustrated in FIG. 3 is a block diagram for an embodiment of the present invention. Each constituent element in the block diagram is subject to integration, addition, or omission according to specifications of the image display controller 170 actually realized.

Particularly, the frame rate converter 350 and the formatter 360 may be provided separately independently of each other or may be separately provided as one module, without being provided within the controller 170.

Figure 4A:
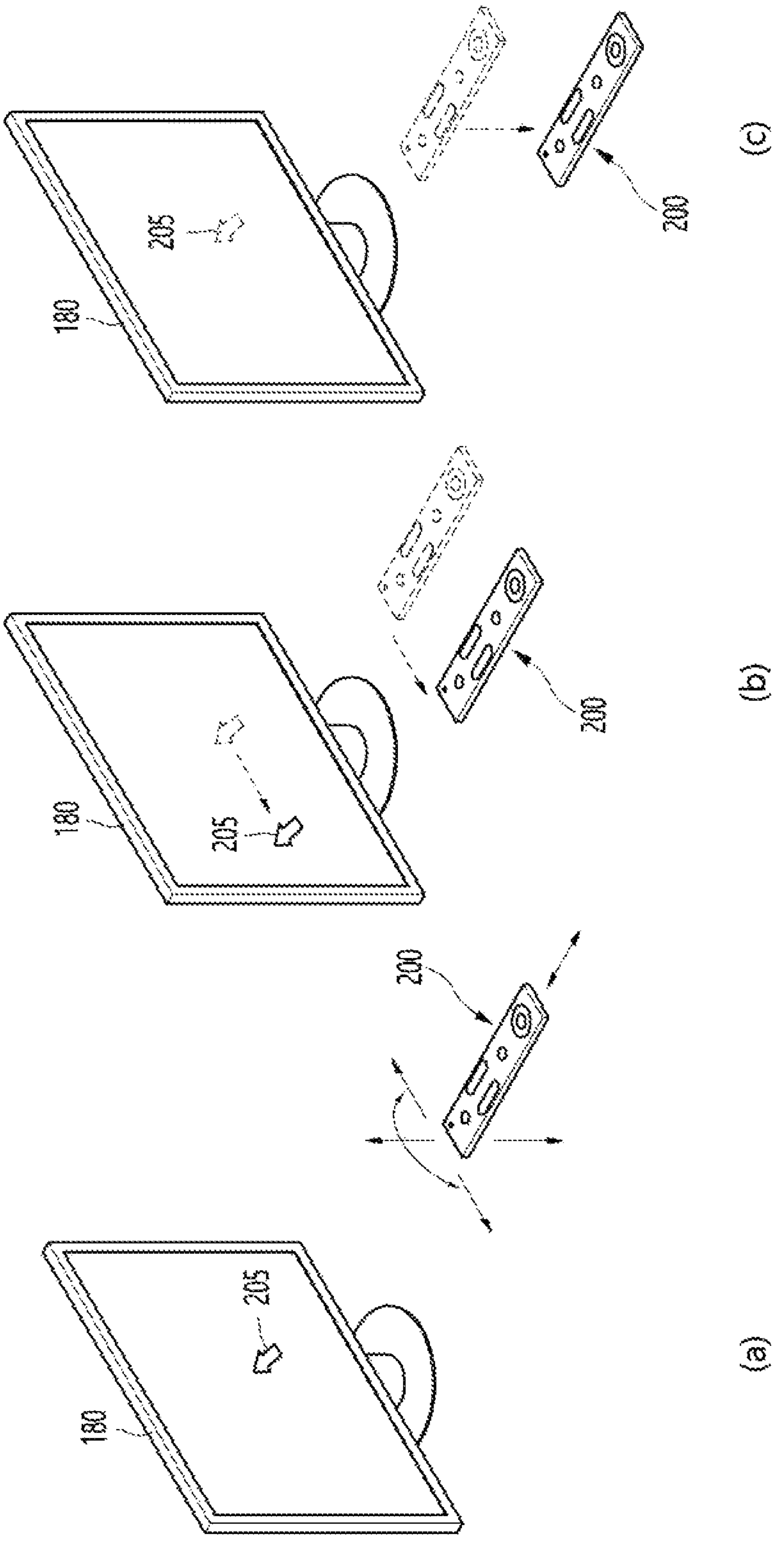
FIG. 4A is a diagram illustrating a method in which the remote controller in FIG. 2 performs control.

FIG. 4A is a diagram illustrating a method in which the remote controller in FIG. 2 performs control.

In FIG. 4A(a), it is illustrated that a pointer 205 which corresponds to the remote controller 200 is displayed on the display 180.

The user moves or rotates the remote controller 200 upward and downward, leftward and rightward (FIG. 4A(b)), and forward and backward (FIG. 4A(c)). The pointer 205 displayed on the display 180 of the image display apparatus corresponds to movement of the remote controller 200. As in the drawings, movement of the pointer 205, which depends on the movement of the remote controller 200 in a 3D space, is displayed and thus, the remote controller 200 is named a spatial remote controller or a 3D pointing device.

FIG. 4A(b) illustrates that, when the user moves the remote controller 200 leftward, the pointer 205 displayed on the display 180 of the image display apparatus correspondingly moves leftward.

Information on the movement of the remote controller 200, which is detected through a sensor of the remote controller 200, is transferred to the image display apparatus. The image display apparatus calculates the information on the movement of the remote controller 200 from coordinates of the pointer 205. The image display apparatus displays the pointer 205 in such a manner that the pointer 25 corresponds to the calculated coordinates.

FIG. 4A(c) illustrates a case where the user moves the remote controller 200 away from the display 180 in a state where a specific button within the remote controller 200 is held down. Accordingly, a selection area within the display 180, which corresponds to the pointer 205, is zoomed in so that the selection area is displayed in an enlarged manner. Conversely, in a case where the user causes the remote controller 200 to approach the display 180, the selection area within the display 180, which corresponds to the pointer 205, is zoomed out so that the selection is displayed in a reduced manner. On the other hand, in a case where the remote controller 200 moves away from the display 180, the selection area may be zoomed out, and in a case where the remote controller 200 approaches the display 180, the selection area may be zoomed in.

On the other hand, an upward or downward movement, or a leftward or rightward movement is not recognized in a state where a specific button within the remote controller 200 is held down. That is, in a case where the remote controller 200 moves away from or approaches the display 180, only a forward or backward movement is set to be recognized without the upward or downward movement, or the leftward or rightward movement being recognized. Only the pointer 205 moves as the remote controller 200 moves upward, downward, leftward, or rightward, in a state where a specific button within the remote controller 200 is not held down.

On the other hand, a moving speed or a moving direction of the pointer 205 corresponds to a moving speed or a moving direction of the remote controller 200, respectively.

Figure 4B:
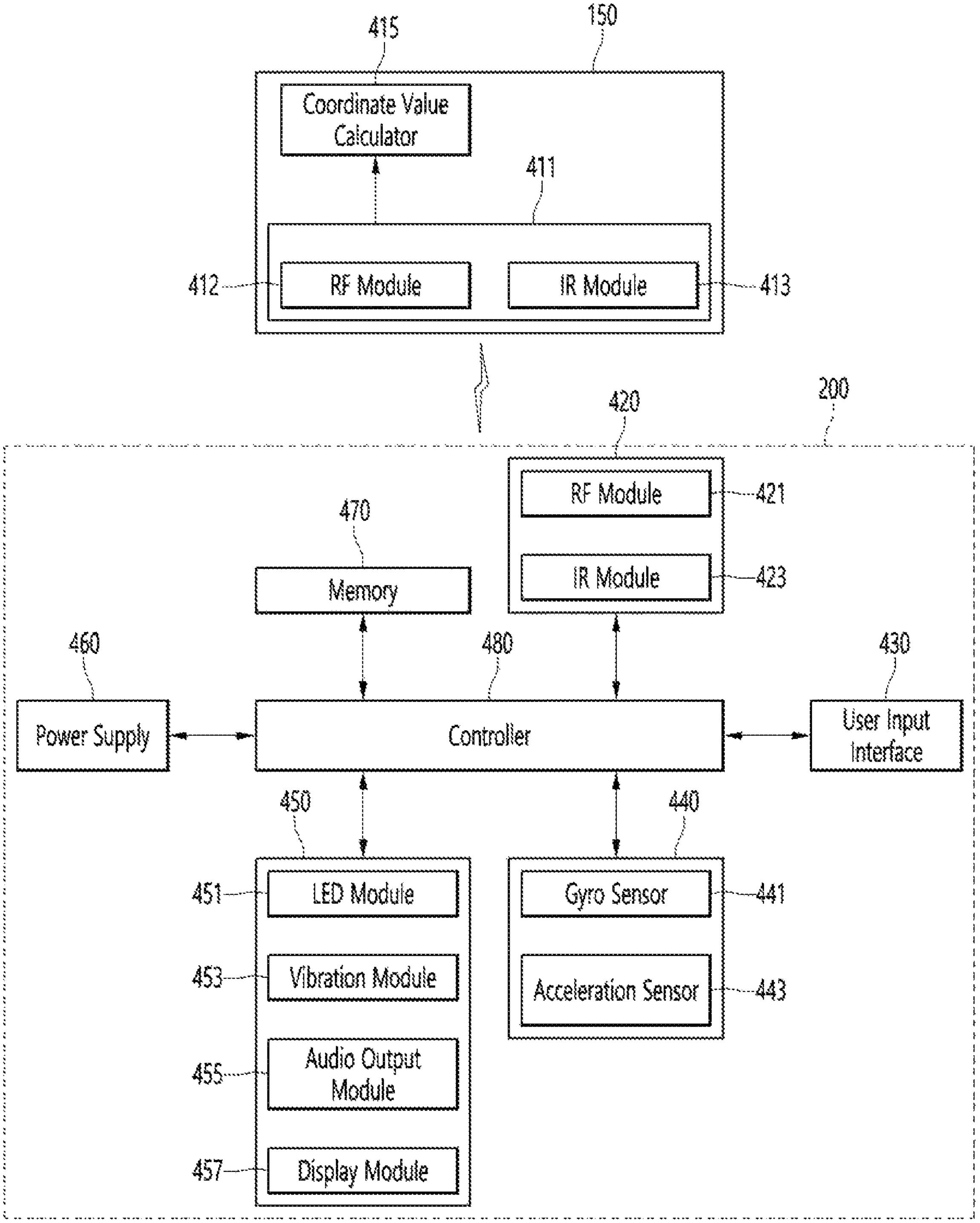
FIG. 4B is a block diagram of the inside of the remote controller in FIG. 2.

FIG. 4B is a block diagram of the inside of the remote controller in FIG. 2.

For description with reference to the drawings, the remote controller 200 includes a wireless communication module 420, a user input interface 430, a sensor module 440, an output interface 450, a power supply 460, a memory 470, and a controller 480.

The wireless communication module 420 transmits and receives a signal to and from an arbitrary one of the image display apparatuses according to the embodiments of the present invention, which are described above. Of the image display apparatuses according to the embodiments of the present invention, one image display apparatus is taken as an example for description.

According to the present embodiment, the remote controller 200 includes an RF module 421 that transmits and receives a signal to and from the image display apparatus 100 in compliance with RF communication standards. In addition, the remote controller 200 includes an IR module 423 that possibly transmits and receives a signal to and from the image display apparatus 100 in compliance with IR communication standards.

According to the present embodiment, the remote controller 200 transfers a signal containing information on the movement of the remote controller 200 to the image display apparatus 100 through the RF module 421.

In addition, the remote controller 200 receives a signal transferred by the image display apparatus 100, through the RF module 421. In addition, the remote controller 200 transfers a command relating to power-on, power-off, a channel change, or a volume change, to the image display apparatus 100, through the IR module 423, whenever needed.

The user input interface 430 is configured with a keypad, buttons, a touch pad, a touch screen, or so on. The user inputs a command associated with the image display apparatus 100 into the remote controller 200 by operating the user input interface 430. In a case where the user input interface 430 is equipped with a physical button, the user inputs the command associated with the image display apparatus 100 into the remote controller 200 by performing an operation of pushing down the physical button. In a case where the user input interface 430 is equipped with a touch screen, the user inputs the command associated with the image display apparatus 100 into the remote controller 200 by touching on a virtual key of the touch screen. In addition, the user input interface 430 may be equipped with various types of input means operated by the user, such as a scroll key or a jog key, and the present embodiment does not impose any limitation on the scope of the present invention.

The sensor module 440 includes a gyro sensor 441 or an acceleration sensor 443. The gyro sensor 441 senses information on the movement of the remote controller 200.

As an example, the gyro sensor 441 senses the information on operation of the remote controller 200 on the x-, y-, and z-axis basis. The acceleration sensor 443 senses information on the moving speed and so on of the remote controller 200. On the other hand, a distance measurement sensor is further included. Accordingly, a distance to the display 180 is sensed.

The output interface 450 outputs an image or an audio signal that corresponds to the operating of the user input interface 430 or corresponds to a signal transferred by the image display apparatus 100. Through the output interface 450, the user recognizes whether or not the user input interface 430 is operated or whether or not the image display apparatus 100 is controlled.

As an example, the output interface 450 includes an LED module 451, a vibration module 453, an audio output module 455, or a display module 457. The LED module 451, the vibration module 453, the audio output module 455, and the display module 457 emits light, generates vibration, outputs audio, or outputs an image, respectively, when the input interface 435 is operated, or a signal is transmitted and received to and from the image display apparatus 100 through a wireless communication module 420.

The power supply 460 supplies a power to the remote controller 200. In a case where the remote controller 200 does not move for a predetermined time, the power supply 460 reduces power consumption by interrupting power supply. In a case where a predetermined key provided on the remote controller 200 is operated, the power supply 460 resumes the power supply.

Various types of programs, pieces of application data, and so on that are necessary for control or operation of the remote controller 200 are stored in the memory 470. In a case where the remote controller 200 transmits and receives a signal to and from the image display apparatus 100 in a wireless manner through the RF module 421, the signal is transmitted and received in a predetermined frequency band between the remote controller 200 and the image display apparatus 100. The controller 480 of the remote controller 200 stores information on, for example, a frequency band in which data is transmitted and received in a wireless manner to and from the image display apparatus 100 paired with the remote controller 200, in the memory 470, and makes a reference to the stored information.

The controller 480 controls all operations associated with the control by the remote controller 200. The controller 480 transfers a signal that corresponds to operating of a predetermined key of the user input interface 430, or a signal that corresponds to the movement of the remote controller 200, which is sensed in the sensor module 440, to the image display apparatus 100 through the wireless communication module 420.

A user input interface 150 of the image display apparatus 100 includes a wireless communication module 411 that transmits and receives a signal in a wireless manner to and from the remote controller 200, and a coordinate value calculator 415 that calculates a coordinate value of the pointer, which corresponds to the operation of the remote controller 200.

The user input interface 150 transmits and receives the signal in a wireless manner to and from the remote controller 200 through the RF module 412. In addition, a signal transferred in compliance with the IR communication standards by the remote controller 200 through the IR module 413 is received.

The coordinate value calculator 415 calculates a coordinate value (x, y) of the pointer 205 to be displayed on the display 180, which results from compensating for a hand movement or an error, from a signal that corresponds to the operation of the remote controller 200, which is received through the wireless communication module 411.

A transfer signal of the remote controller 200, which is input into the image display apparatus 100 through the user input interface 150 is transferred to the controller 170 of the image display apparatus 100. The controller 170 determines information on the operation of the remote controller 200 and information on operating of a key, from the signal transferred by the remote controller 200, and correspondingly controls the image display apparatus 100.

As another example, the remote controller 200 calculates a coordinate value of a pointer, which corresponds to the operation of the remote controller 200, and outputs the calculated value to the user input interface 150 of the image display apparatus 100. In this case, the user input interface 150 of the image display apparatus 100 transfers information on the received coordinate values of the pointer, to the controller 170, without performing a process of compensating for the hand movement and the error.

In addition, as another example, unlike in the drawings, it is also possible that the coordinate value calculator 415 is included within the controller 170 instead of the user input interface 150.

Figure 5:
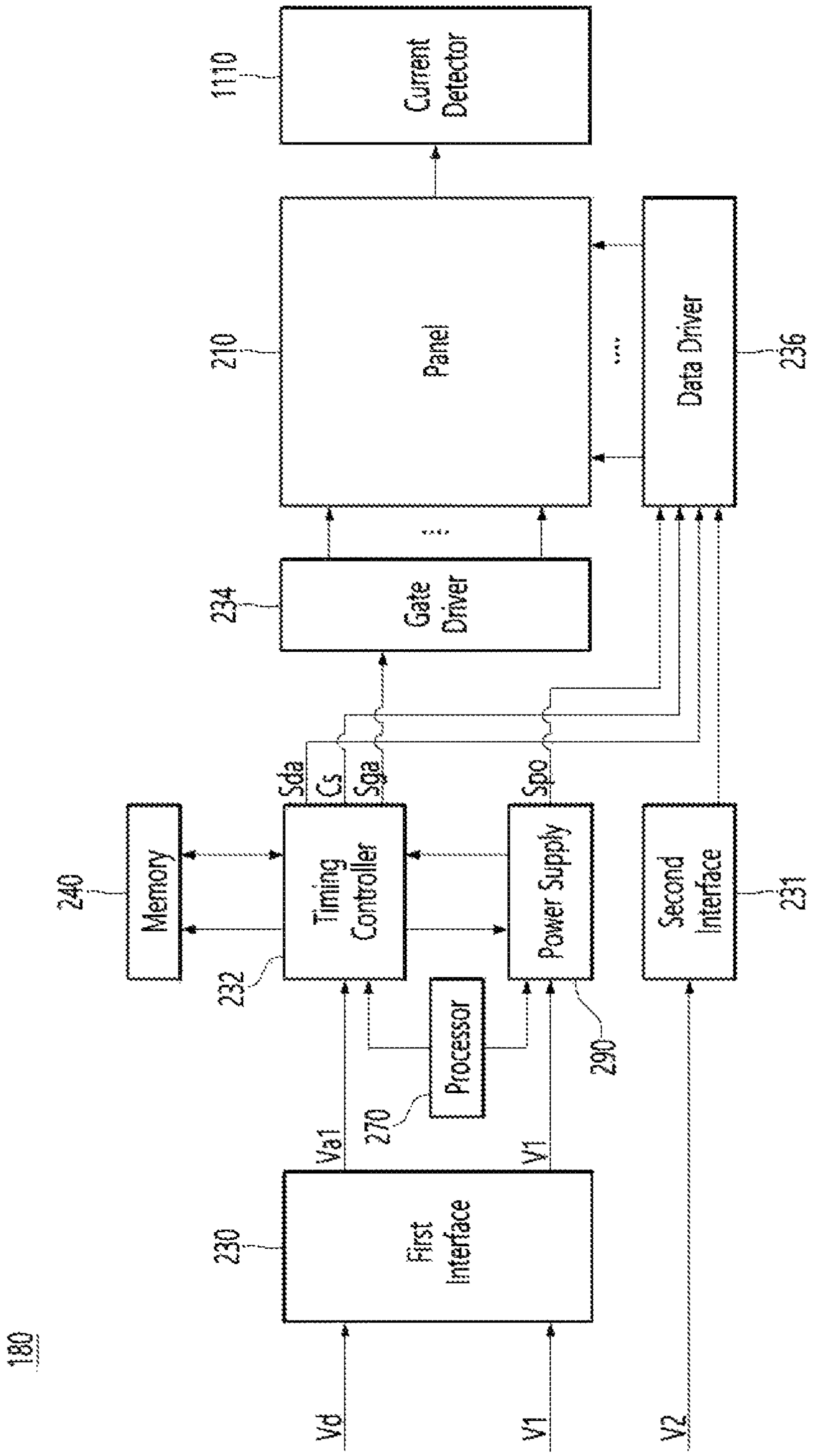
FIG. 5 is a block diagram of the inside of the display in FIG. 2.

FIG. 5 is a block diagram of the inside of the display in FIG. 2.

With reference with the drawings, the display 180 based on the organic light-emitting diode may include the OLED panel 210, a first interface 230, a second interface 231, a timing controller 232, a gate driver 234, a data driver 236, a memory 240, a processor 270, a power supply 290, an electric current detector 1110, and so on.

The display 180 receives an image signal Vd, a first direct current power V1, and a second direct current power V2. Based on the image signal Vd, the display 180 display a predetermined image is displayed.

On the other hand, the first interface 230 within the display 180 receives the image signal Vd and the first direct current power V1 from the controller 170.

At this point, the first direct current power V1 is used for operation for each of the power supply 290 and the timing controller 232 within the display 180.

Next, the second interface 231 receives the second direct current power V2 from the external power supply 190. On the other hand, the second direct current power V2 is input into the data driver 236 within the display 180.

Based on the image signal Vd, the timing controller 232 outputs a data drive signal Sda and a gate drive signal Sga.

For example, in a case where the first interface 230 converts the image signal Vd input, and outputs image signal val that results from the conversion, the timing controller 232 outputs the data drive signal Sda and the gate drive signal Sga based on the image signal val that results from the conversion.

The timing controller 232 further receives a control signal, the vertical synchronization signal Vsync, and so on, in addition to a video signal Vd from the controller 170.

The timing controller 232 outputs the gate drive signal Sga for operation of the gate driver 234 and the data drive signal Sda for operation of the data driver 236, based on the control signal, the vertical synchronization signal Vsync, and so on in addition to the video signal Vd.

In a case where the OLED panel 210 includes a subpixel for RGBW, the data drive signal Sda at this time is a data drive signal for a subpixel for RGBW.

On the other hand, the timing controller 232 further outputs a control signal Cs to the gate driver 234.

The gate driver 234 and the data driver 236 supplies a scanning signal and an image signal to the OLED panel 210 through a gate line GL and a data line DL according to the gate drive signal Sga and the data drive signal Sda, respectively, from the timing controller 232. Accordingly, a predetermined image is displayed on the OLED panel 210.

On the other hand, the OLED panel 210 includes an organic light-emitting layer. In order to display an image, many gate lines GL and many data lines DL are arranged to intersect each other in a matrix form, at each pixel that corresponds to the organic light-emitting layer.

On the other hand, the data driver 236 outputs a data signal to the OLED panel 210 based on the second direct current power V2 from the second interface 231.

The power supply 290 supplies various types of powers to the gate driver 234, the data driver 236, the timing controller 232, and so on.

The electric current detector 1110 detects an electric current that flows through a subpixel of the OLED panel 210. The electric current detected is input into the processor 270 and or so for accumulated electric-current computation.

The processor 270 performs various types of control within the display 180. For example, the gate driver 234, the data driver 236, the timing controller 232, and so on are controlled.

On the other hand, the processor 270 receives information of the electric current that flows through the subpixel of the OLED panel 210, from the electric current detector 1110.

Then, based on the information of the electric current that flows through the subpixel of the OLED panel 210, the processor 270 computes an accumulated electric current of a subpixel of each organic light-emitting diode (OLED) panel 210. The accumulated electric current computed is stored in the memory 240.

On the other hand, in a case where the accumulated electric current of the subpixel of each organic light-emitting diode (OLED) panel 210 is equal to or greater than an allowed value, the processor 270 determines the subpixel as a burn-in subpixel.

For example, in a case where the accumulated electric current of the subpixel of each organic light-emitting diode (OLED) panel 210 is 300000 A or higher, the subpixel is determined as a burn-in subpixel.

On the other hand, in a case where, among subpixels of each organic light-emitting diode (OLED) panel 210, an accumulated electric current of one subpixel approaches the allowed value, the processor 270 determines the one subpixel as expected to be a burn-in subpixel.

On the other hand, based on the electric current detected in the electric current detector 1110, the processor 270 determines a subpixel that has the highest accumulated electric current, as expected to be a burn-in subpixel.

Figure 6A:
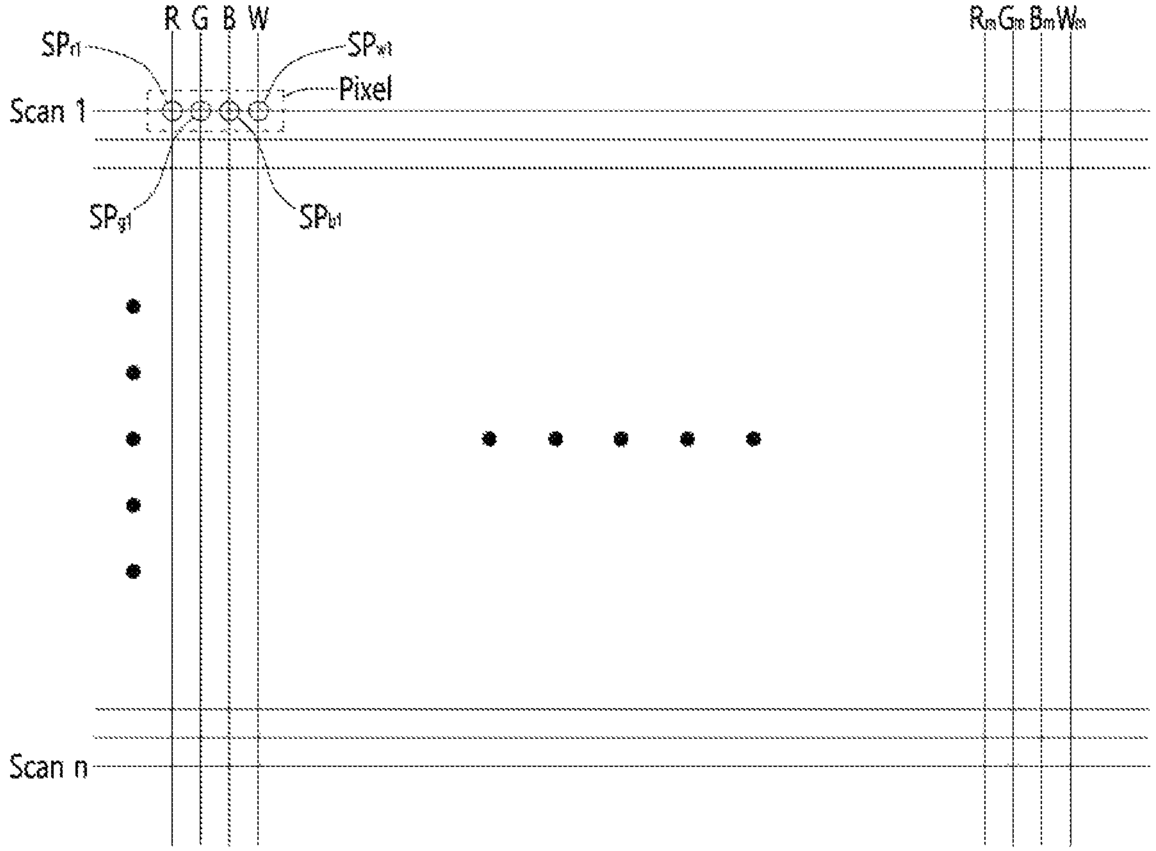
FIGS. 6A and 6B are diagrams that are referred to for description of the OLED panel in FIG. 5.
Figures 6B, 7:
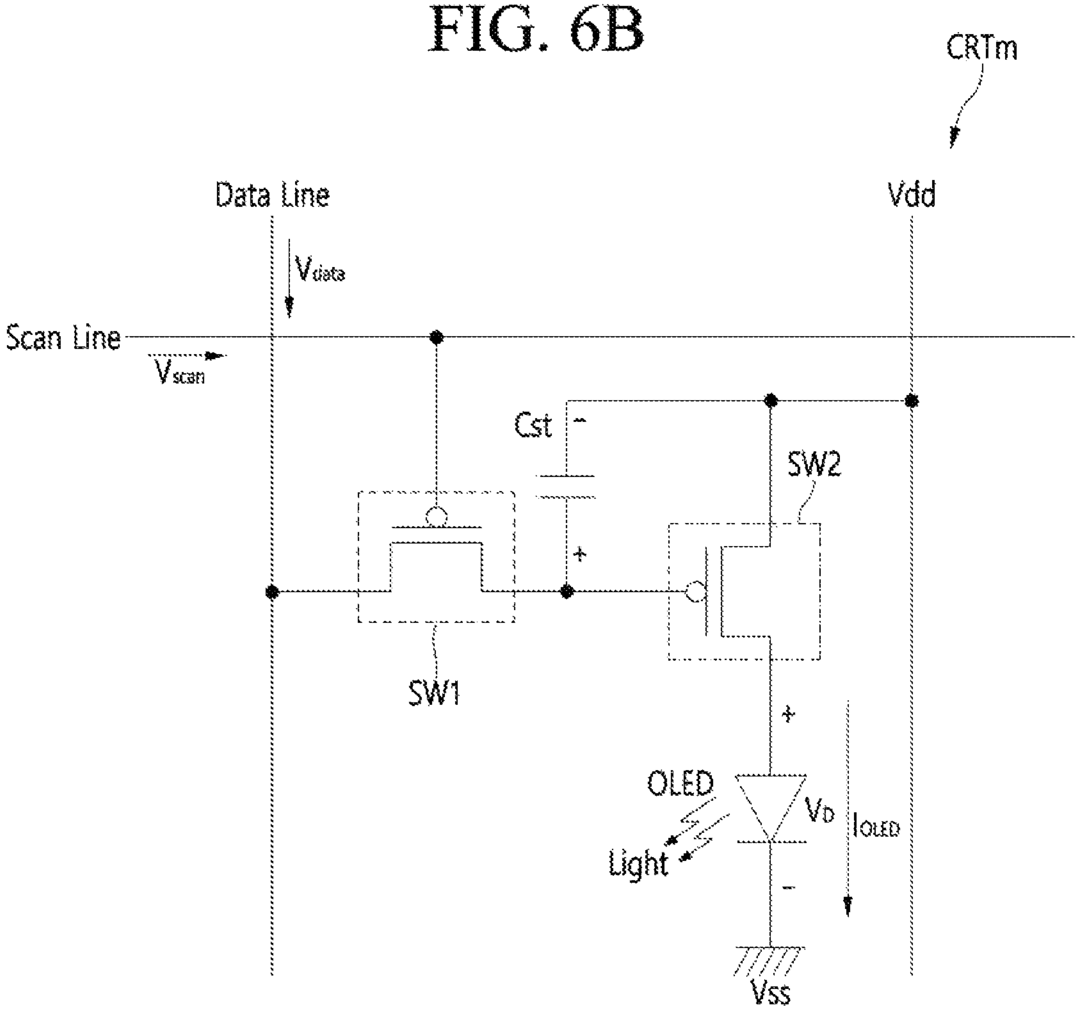
FIG. 7 is an exemplary diagram for explaining the image data stored in the frame memory.

FIGS. 6A and 6B are diagrams that are referred to for description of the OLED panel in FIG. 5.

First, FIG. 6A is a diagram illustrating a pixel within the OLED panel 210.

With reference to the drawings, the OLED panel 210 includes a plurality of scan lines Scan 1 to Scan n and a plurality of data lines R1, G1, B1, W1 to Rm, Gm, Bm, Wm that intersect a plurality of scan lines Scan 1 to Scan n, respectively.

On the other hand, an area where the scan line and the data line within the OLED panel 210 intersect each other is defined as a subpixel. In the drawings, a pixel that includes a subpixel SPr1, SPg1, SPb1, SPw1 for RGBW is illustrated.

FIG. 6B illustrates a circuit of one subpixel within the OLED panel in FIG. 6A.

With reference to the drawings, an organic light-emitting subpixel circuit CRTm includes a switching element SW1, a storage capacitor Cst, a drive switching element SW2, and an organic light-emitting layer (OLED), which are active-type elements.

A scan line is connected to a gate terminal of the scan switching element SW1. The scanning switching element SW1 is turned on according to a scan signal Vscan input. In a case where the scan switching element SW1 is turned on, a data signal Vdata input is transferred to the gate terminal of the scan switching element SW2 or one terminal of the storage capacitor Cst.

The storage capacitor Cst is formed between the gate terminal and a source terminal of the drive switching element SW2. A predetermined difference between a data signal level transferred to one terminal of the storage capacitor Cst and a direct current (Vdd) level transferred to the other terminal of the storage capacitor Cst is stored in the storage capacitor Cst.

For example, in a case where data signals have different levels according to a pulse amplitude modulation (PAM) scheme, power levels that are stored in the storage capacitor Cst are different according to a difference between levels of data signals Vdata.

As another example, in a case where data signals have different pulse widths according to a pulse width modulation (PWM) scheme, power levels that are stored in the storage capacitor Cst are different according to a difference between pulse widths of data signals Vdata.

The drive switching element SW2 is turned on according to the power level stored in the storage capacitor Cst. In a case where the drive switching element SW2 is turned on, a drive electric current (IOLED), which is in proportion to the stored power level, flows through the organic light-emitting layer (OLED). Accordingly, the organic light-emitting layer (OLED) performs a light-emitting operation.

The organic light-emitting layer (OLED) includes a light-emitting layer (EML) for RGBW, which corresponds to a subpixel, and includes at least one of the following layers: a hole implementation layer (HIL), a hole transportation layer (HTL), an electron transportation layer (ETL), and an electron implementation layer (EIL). In addition to these, the organic light-emitting layer includes a hole support layer and so on.

On the other hand, when it comes to a subpixel, the organic light-emitting layer outputs while light, but in the case of the subpixels for green, red, and blue, a separate color filter is provided in order to realize color. That is, in the case of the subpixels for green, red, and blue, color filters for green, red, and blue, respectively, are further provided. On the other hand, in the case of the subpixel for white, white light is output and thus a separate color filter is unnecessary.

On the other hand, in the drawings, as the scan switching element SW1 and the drive switching element SW2, p-type MOSFETs are illustrated, but it is also possible that n-type MOSFETs, or switching elements, such as JETs, IGBTs, or SICs, are used.

On the other hand, the controller 170 may perform automatic current limit (ACL) so that the luminance of the image is limited to be not higher than a predetermined luminance.

Here, the automatic current limit (ACL) may be a method for lowering the luminance of the overall screen by determining an average picture level (APL) of the OLED panel 210 by summing the total data values for displaying a video on the OLED panel 210, adjusting the light emitting period according to the level of the average picture level, or controlling the driving current by changing the video data itself.

When the controller 170 performs the automatic current limit (ACL), the maximum value of the electric current supplied to the OLED panel 210 may be limited to the current limit value.

A plurality of gate lines GL and a plurality of data lines DL for displaying an image may be arranged on the OLED panel 210 to intersect with each other in a matrix form, and a plurality of pixels may be arranged in the intersection areas between the gate lines GL and the data lines DL. The gate lines GL may be scan lines, and the data lines DL may be source lines.

The timing controller 232 may receive, from the controller 170, a control signal, R, G, and B data signals, a vertical synchronization signal (Vsync), a horizontal synchronization signal (Hsync), a data enable signal (DE), and the like, may control the data driver 236 and the gate driver 234 in response to the control signal, and may rearrange the R, G, and B data signals and provided the rearranged R, G, and B data signals to the data driver 236.

Specifically, the timing controller 232 may adjust and output the R, G, and B data signals input from the controller 170 to match the timings required by the data driver 236 and the gate driver 234. The timing controller 232 may output control signals for controlling the data driver 236 and the gate driver 234.

The data driver 236 and the gate driver 234 may supply the image data and the scan signals to the OLED panel 210 through the data lines DL and the gate lines GL under the control of the timing controller 232.

The timing controller 232 may scan an image on a plurality of pixels arranged on the OLED panel 210. As the scanning method, there may be a progressive scanning method and an interlaced scanning method. The progressive scanning method may be a method of sequentially displaying content to be displayed on a screen from start to finish, and the interlace scanning method may be a method of displaying images alternately in odd and horizontal lines.

The gate driver 234 may sequentially select the gate lines GL of the OLED panel 210 by sequentially supplying a gate pulse synchronized with a data voltage to the gate lines GL in response to gate timing control signals.

The data driver 236 may convert image data corresponding to the selected gate line into an image signal, and may output the converted image signal to the data line DL of the OLED panel 210.

Meanwhile, the memory 240 may include a frame memory.

The frame memory may store image data to be supplied to the data driver 236.

FIG. 5 illustrates that the frame memory is an element separate from the timing controller 232, but according to an embodiment, the frame memory may be provided inside the timing controller 232.

The frame memory may store image data to be supplied to the data driver 236 in units of frames based on the R, G, and B data signals output from the controller 170.

The frame may refer to one still image constituting an image output from the OLED panel 210.

FIG. 7 is an exemplary diagram for explaining the image data stored in the frame memory.

The image data illustrated in FIG. 7 may include control information of each of a plurality of pixels constituting one still image. For example, the image data illustrated in FIG. 7 may include information indicating that a pixel at position (1, 1) is an R subpixel ON, a G subpixel ON, and a B subpixel OFF, a pixel at position (1, 2) is an R subpixel ON, a G subpixel OFF, and a B subpixel ON, a pixel at position (1, 3) is an R subpixel OFF, a G subpixel OFF, and a B subpixel OFF, . . . , and a pixel at position (4, 4) is an R subpixel ON, a G subpixel ON, and a B subpixel ON.

FIG. 7 illustrates an example in which the number of pixels constituting the OLED panel 210 is 16, but this is only an example for convenience of description. For example, a 55-inch OLED display device may include 2 million to 10 million pixels, and the number of pixels is increasing with the development of technology.

Meanwhile, a frame unit in which the frame memory stores image data may be one frame.

In this case, the timing controller 232 may output an image through a continuous process of storing a first frame in the frame memory, analyzing the first frame stored in the frame memory, outputting the first frame to the OLED panel 210, deleting the first frame from the frame memory, storing a second frame that is a next frame of the first frame, analyzing the second frame stored in the frame memory, and outputting the second frame to the OLED panel 210.

As the number of pixels constituting one frame increases, the time required for the timing controller 232 to analyze the image stored in the frame memory may increase. In this case, the frame rate, which is frames per second, may be slow.

Therefore, the image display apparatus 100 according to the embodiment of the present disclosure may improve the frame rate by changing the frame size, and the frame size may refer to the size of the image data stored in the frame memory.

The frame size may be 1 frame or less. For example, the frame size may include 1 frame, ½ frame, ⅓ frame, ¼ frame, ⅕ frame, ⅛ frame, 1/16 frame, 1/32 frame, etc.

When the ½ frame means half of 1 frame and 1 frame means control information for 16 pixels illustrated in FIG. 7, the ½ frame may mean control information for 8 pixels among the 16 pixels illustrated in FIG. 7.

Figure 8:
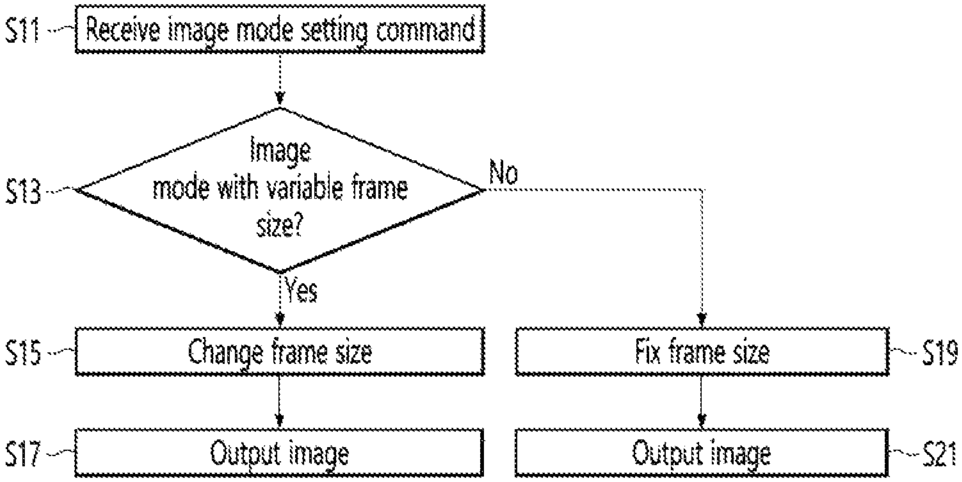
FIG. 8 is a flowchart illustrating an operating method of a display device according to an embodiment of the present disclosure.

FIG. 8 is a flowchart illustrating an operating method of a display device according to an embodiment of the present disclosure.

The controller 170 may receive an image mode setting command (S11).

Image properties such as image size, image ratio, luminance, and contrast are preset in the image mode in order to optimize the user's image viewing. For example, the image mode may include a standard mode, a clear mode, a movie mode, a game mode, a sports mode, and a photo mode.

According to an embodiment, the controller 170 may receive an image mode setting command through the user input interface 150. Specifically, the user may select the image mode through the remote controller 200. As the remote controller 200 transmits, to the user input interface 150, the image mode setting command according to the image mode selection, the controller 170 may receive the image mode setting command.

According to another embodiment, the controller 170 may receive the image mode setting command by detecting the type of the input image signal. For example, the controller 170 may receive the image mode setting command for selecting the standard mode when the input image signal is a broadcast image input through the tuner 110, may receive the image mode setting command for selecting the game mode when the image signal is received through the external device interface 130, and may receive the image mode setting command for selecting the photo mode when the input image signal is a still image file stored in the memory 140.

That is, the controller 170 may change the image mode by receiving the image mode setting command based on the configuration in which the image signal is output, metadata of the image signal, and the like.

The controller 170 may determine whether the image mode is an image mode set with variable frame size (S13).

The image mode may be an image mode in which the frame size is fixed or an image mode in which the frame size is variable.

The controller 170 may set the image mode in which the frame size is fixed and the image mode in which the frame size is variable. For example, the standard mode, the clear mode, the movie mode, and the photo mode may be the image mode in which the frame size is fixed, and the game mode and the sports mode may be the image mode in which the frame size is variable.

According to an embodiment, the image mode in which the frame size is fixed and the image mode in which the frame size is variable may be set by default when the image display apparatus 100 is manufactured.

According to another embodiment, the controller 170 may set the frame size fixed mode or the frame size variable mode for each image mode through the user input interface 150. The user may set the frame size fixed mode or the frame size variable mode for each image mode.

When the operating image mode is the image mode set with variable frame size, the controller 170 may change the frame size (S15) and may output an image (S17).

However, when the operating image mode is not the image mode set with variable frame size, the controller 170 may fix the frame size (S19) and may output an image (S21). That is, when the operating image mode is the image mode in which the frame size is fixed, the controller 170 may fix the frame size and may output an image.

As described above, according to the present disclosure, the frame size may be fixed or varied according to the image mode. In this case, there is an advantage of providing an image having high luminance or a fast image output speed according to the characteristics of the output image.

Meanwhile, when the controller 170 changes the frame size, the change of the luminance may be required according to the changed frame size.

Figure 9:
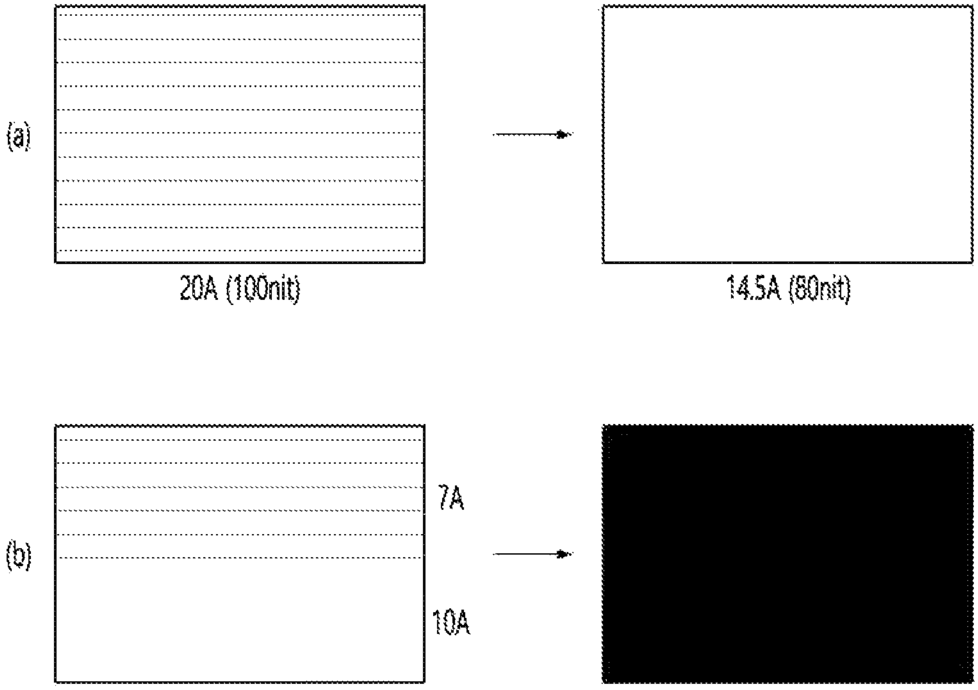
FIG. 9 is an exemplary diagram illustrating a problem that may occur when a frame size is changed.

FIG. 9 is an exemplary diagram illustrating a problem that may occur when a frame size is changed.

The timing controller 232 may analyze the image data stored in the frame memory, and may control the image luminance by controlling the current supplied to the OLED panel 210 according to the analysis result.

When the automatic current limit (ACL) is performed, the controller 170 may adjust the supply current to be less than or equal to the current limit value when the current required for outputting the frame is greater than the current limit value as a result of analyzing the image data of the frame stored in the frame memory.

(a) of FIG. 9 is a view in which image data of 1 frame is analyzed and an image is output. The controller 170 may analyze all of 1 frame to obtain an analysis result indicating that an image can be output with a luminance of 100 nit when an electric current of 20 A is supplied. When the current limit value is 14.5 A, the controller 170 can output an image by supplying only an electric current of 14.5 A by lowering the luminance from 100 nit to 80 nit.

Meanwhile, when the frame size is reduced, the frame memory may store image data of 1 frame or less, and the controller 170 may analyze only some image data of 1 frame.

For example, the controller 170 may analyze only image data of ½ frame. (b) of FIG. 9 is a view in which image data of ½ frame is analyzed and an image is output. When only ½ frame, which is half of 1 frame, is analyzed, the controller 170 may obtain an analysis result indicating that an image can be output with a luminance of 100 nit when an electric current of 7 A is supplied. Therefore, an electric current of 14 A may be supplied for output of 1 frame.

However, the remaining ½ frame that is not analyzed in 1 frame may be image data that requires an electric current (e.g., 10 A) higher than 7 A. In this case, an error such as screen flicker may occur.

Therefore, when the frame size is changed, luminance adjustment may be required according to the frame size.

Hereinafter, a method of adjusting a frame size according to various embodiments of the present disclosure will be described.

Figure 10:
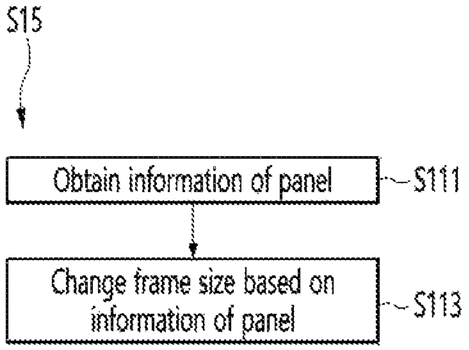
FIG. 10 is a flowchart illustrating a method of changing a frame size according to a first embodiment of the present disclosure.

FIG. 10 is a flowchart illustrating a method of changing a frame size according to a first embodiment of the present disclosure. That is, FIG. 10 is a flowchart illustrating the changing of the frame size in operation S15 of FIG. 8.

The controller 170 may obtain information of a panel (S111).

The information of the panel indicates the characteristics of the OLED panel 210, and may include a screen size, a pixel structure constituting the OLED panel 210, and a process method of the OLED panel 210.

The memory 140 may store the information of the panel. For example, the memory 140 may store the information of the panel indicating that the screen size is 55 inches or 65 inches, and the controller 170 may obtain the information of the panel indicating that the screen size is 55 inches.

The controller 170 may change the frame size based on the information of the panel (S113).

The controller 170 may change the frame size differently according to the information of the panel. For example, the controller 170 may change the frame size to 1 frame or less according to the information of the panel, and the frame size may be any one of 1 frame, ½ frame, ¼ frame, and ⅛ frame.

When the information of the panel is the screen size, the controller 170 may set the frame size to be smaller as the screen size decreases. That is, when the screen size is a first size, the controller 170 may set the frame size to be larger than the frame size when the screen size is a second size smaller than the first size. For example, the controller 170 may set the frame size to ½ frame when the screen size is 65 inches, and may set the frame size to ¼ frame when the screen size is 55 inches.

As the screen size is smaller, the maximum value of the supply current is smaller. Therefore, when analyzing part of the frame, there is the probability that the required electric current will be greater than the expected value due to the remaining image data that has not been analyzed. As the screen size is smaller, the frame size is more reduced to further improve the processing speed of the timing controller 232.

In this case, there is an advantage in that an image output speed can be improved, considering panel characteristics such as the screen size.

Meanwhile, according to an embodiment, the controller 170 may change the frame size based on the set luminance together with the information of the panel.

Specifically, the controller 170 may set the luminance in advance, and may set the luminance based on a command received through the user input interface 150. The user may set the desired luminance through the remote controller 200. In this case, the controller 170 may change the frame size to provide a luminance higher than the set luminance.

For example, if the available luminance is 80 nit when the screen size is 55 inches and the frame size is ½ frame, and the available luminance is 70 nit when the screen size is 55 inches and the frame size is ¼ frame, the controller 170 may change the frame size to ½ when the set luminance is 75 nit.

In this case, there is an advantage of improving the image output speed considering not only panel characteristics such as the screen size, but also luminance desired by the user.

Figure 11:
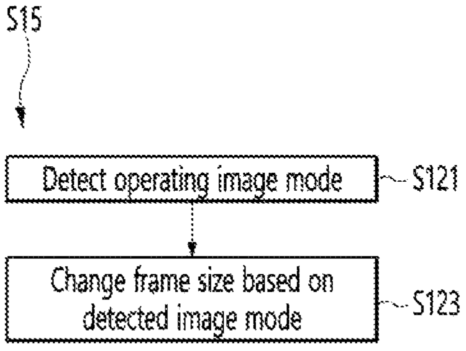
FIG. 11 is a flowchart illustrating a method of changing a frame size according to a second embodiment of the present disclosure.

FIG. 11 is a flowchart illustrating a method of changing a frame size according to a second embodiment of the present disclosure. That is, FIG. 11 is a flowchart illustrating operation S15 of FIG. 8, which is the changing of the frame size.

The controller 170 may detect the operating image mode (S121).

The controller 170 may detect the type of the currently set image mode.

According to an embodiment, the controller 170 may detect the type of the image mode based on the image mode setting command that is most recently received through the user input interface 150. For example, when the most recently received image mode setting command is a game mode selecting command, the controller 170 may detect the game mode as the type of the image mode, and when the most recently received image mode setting command is a sports mode selecting command, the controller 170 may detect the sports mode as the type of the image mode.

According to another embodiment, the controller 170 may detect the type of the image mode based on a configuration for outputting an input image. For example, when the input image is output from the broadcast receiver 105, the controller 170 may detect the standard mode as the type of the image mode, and when the input image is output from the external device interface 130, the controller 170 may detect the game mode as the type of the image mode.

The controller 170 may change the frame size based on the detected image mode (S123).

The memory 140 may prestore the frame size according to the type of the image mode. For example, the memory 140 may store 1 frame as the frame size when the type of the image mode is the standard mode, may store ½ frame as the frame size when the type of the image mode is the sports mode, and may store ¼ frame as the frame size when the type of the image mode is the game mode. In this case, the frame size for each image mode may be stored considering the required luminance and image output speed according to the image type.

The controller 170 may change the frame size based on the frame size for each image mode stored in the memory 140. That is, the controller 170 may receive, from the memory 140, the frame size corresponding to the detected image mode and change the received frame size.

In this case, since the frame size is automatically changed according to the currently operating image mode, there is an advantage that it is possible to provide convenience that the user does not have to manually change the frame size.

Figure 12:
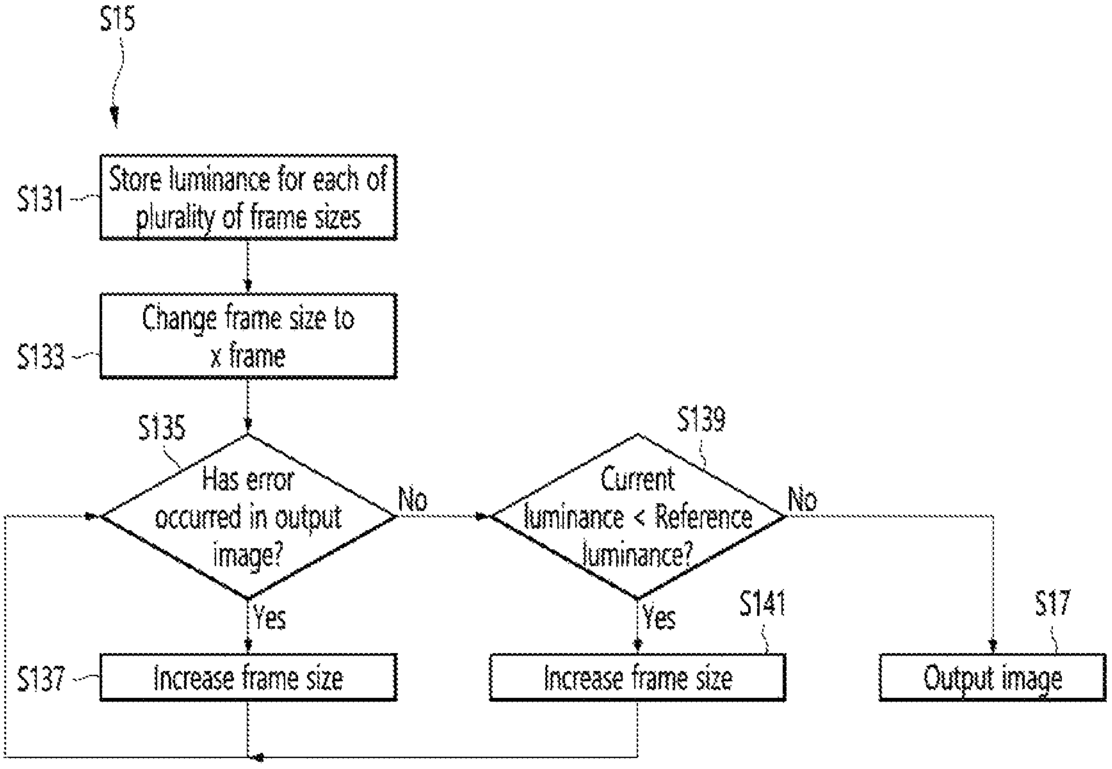
FIG. 12 is a flowchart illustrating a method of changing a frame size according to a third embodiment of the present disclosure.

FIG. 12 is a flowchart illustrating a method of changing a frame size according to a third embodiment of the present disclosure. That is, FIG. 12 is a flowchart illustrating operation S15 of FIG. 8, which is the changing of the frame size.

The controller 170 may store the luminance for each of the plurality of frame sizes in the memory 140 (S131).

For example, the memory 140 may prestore the luminance for each frame size: a luminance of 95 nit when the frame size is ⅞ frame, a luminance of 90 nit when the frame size is ¾ frame, a luminance 85 nit when the frame size is ⅝ frame, a luminance of 80 nit when the size is ½ frame, a luminance of 75 nit when the frame size is ⅜ frame, a luminance of 70 nit when the frame size is ¼ frame, and a luminance of 65 nit when the frame size is ⅛ frame.

The controller 170 may store the luminance for each of the plurality of frame sizes in the memory 140 at the time of manufacturing the image display apparatus 100, or may receive a user input and store the luminance for each of the plurality of frame sizes in the memory 140.

The controller 170 may change the frame size to x frame (S133).

In this case, the x frame refers to an arbitrary frame size, and may refer to a frame size of 1 frame or less. For example, the x frame may be 1 frame, ⅞ frame, ¾ frame, ⅝ frame, ½ frame, ⅜ frame, ¼ frame, ⅛ frame, etc., but is only an example.

When the image mode is an image mode set with variable frame size, the controller 170 may change the frame size to x frame, and the x frame may be the largest frame size among the settable frame sizes.

When the frame size is changed to the x frame, the controller 170 may set the luminance to the luminance corresponding to the x frame.

The controller 170 may determine whether an error has occurred in the output image (S135).

The error means that the image is not normally output, and may include screen flicker or the like.

The controller 170 may determine whether an error has occurred in the output image by comparing whether the electric current required for providing the luminance set when the frame is changed to x frame is smaller than the current limit value.

When it is determined that an error has occurred, the controller 170 may increase the frame size (S137).

The controller 170 may change the frame size to be higher than the current frame size. The controller 170 may change the frame size to a frame size that is one higher level than the current frame size. For example, when the current frame size is ⅝ frame, the controller 170 may change the frame size to ¾ frame, but this is only an example.

When the frame size is changed, the controller 170 may change the luminance according to the changed frame size.

After the frame size is changed, the controller 170 may determine again whether an error has occurred in the output image.

When it is determined that no error has occurred in the output image, the controller 170 may determine whether the current luminance is less than a reference luminance (S139).

The current luminance is a currently set luminance, and the frame size is changed and may refer to a luminance that is changed together.

The reference luminance may be a luminance set by a user or a luminance set at the time of manufacture the image display apparatus 100. The reference luminance may be a minimum luminance provided by a setting of a user or a designer of the image display apparatus 100.

When the current luminance is less than the reference luminance, the controller 170 may increase the frame size (S141).

When the current luminance is less than the reference luminance, the controller 170 may increase the luminance by increasing the frame size. In this manner, even when the frame size is reduced, image luminance equal to or greater than the minimum luminance can be provided.

After increasing the frame size, the controller 170 may determine again whether an error has occurred in the output image and whether the current luminance is less than the reference luminance.

When it is determined that there is no error in the output image and the current luminance is greater than or equal to the reference luminance, the controller 170 may output an image (S17).

That is, the controller 170 may output the image in the frame size providing luminance greater than or equal to the reference luminance without any error in the output image.

Figure 13:
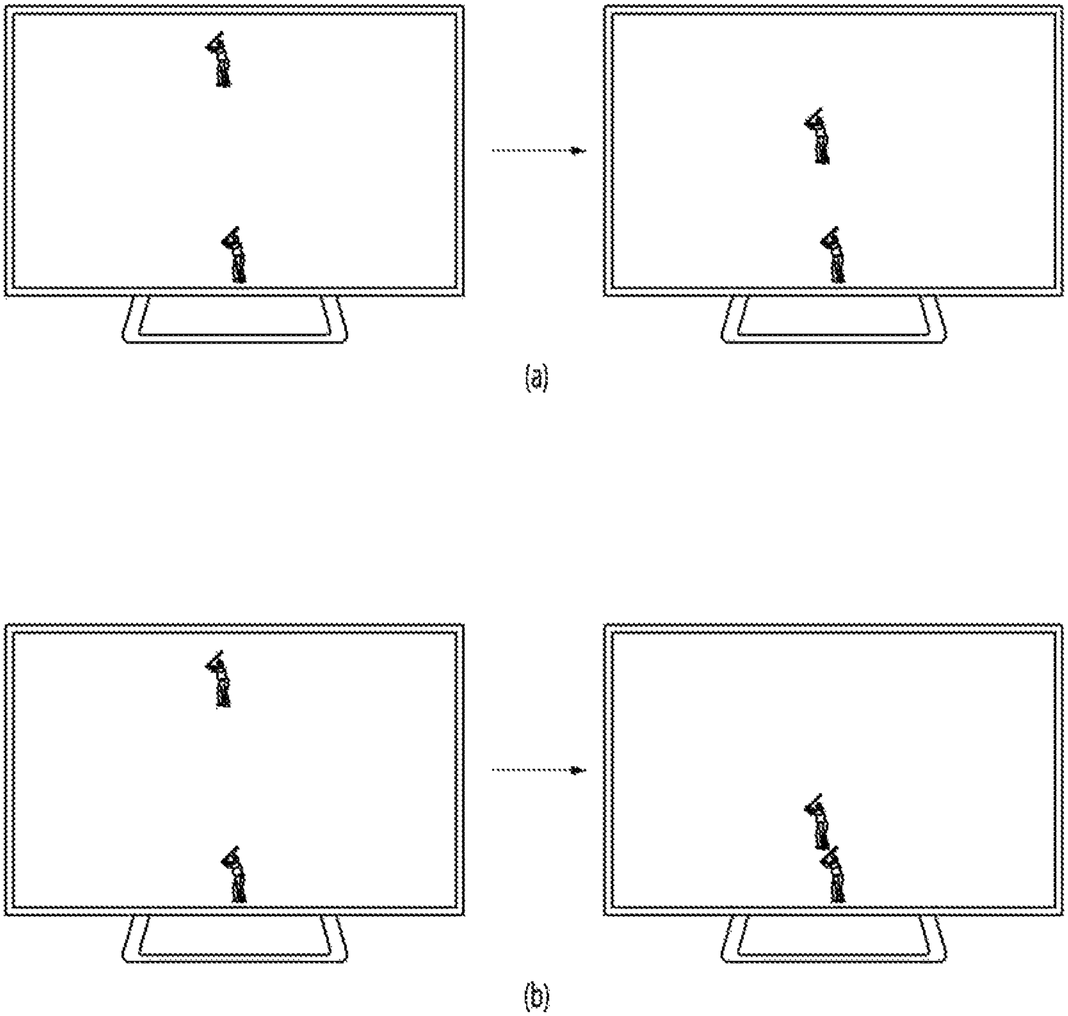
FIG. 13 is an exemplary diagram illustrating a frame size reduction effect of a display device according to an embodiment of the present disclosure.

FIG. 13 is an exemplary diagram illustrating a frame size reduction effect of a display device according to an embodiment of the present disclosure.

(a) of FIG. 13 may be an exemplary diagram of an image output when the frame size is a first frame, and (b) of FIG. 13 may be an exemplary diagram of an image output when the frame size is a second frame smaller than the first frame.

As the frame size is larger, more image data is stored in the frame memory. In this case, since the time required for image data analysis is longer, the image output speed may be slowed. Therefore, when the same time t has elapsed, the image output in (a) of FIG. 13 may be more delayed than the image output in (b) of FIG. 13.

The above description is merely illustrative of the technical idea of the present invention, and various modifications and changes may be made thereto by those skilled in the art without departing from the essential characteristics of the present invention.

Therefore, the embodiments of the present invention are not intended to limit the technical spirit of the present invention but to illustrate the technical idea of the present invention, and the technical spirit of the present invention is not limited by these embodiments.

The scope of protection of the present invention should be interpreted by the appending claims, and all technical ideas within the scope of equivalents should be construed as falling within the scope of the present invention.

The invention claimed is:

1. An organic light emitting diode display device comprising:

a display comprising:

a panel;

a frame memory configured to store image data in units of frames; and a timing controller configured to control the panel to display an image based on the image data stored in the frame memory;

a memory configured to store information of the panel; and a controller configured to:

when operating in a preset image mode, change a frame size, which is a size of the image data stored in the frame memory, based on the information of the panel;

set an image luminance to a first luminance when the frame size is a first frame;

set the image luminance to a second luminance higher than the first luminance when the frame size is a second frame larger than the first frame; and when the first luminance is lower than a reference luminance, increase the frame size from the first frame to the second frame.

2. The organic light emitting diode display device according to claim 1, wherein the controller is configured to change the frame size to 1 frame or less according to the information of the panel.

3. The organic light emitting diode display device according to claim 2, wherein the controller is configured to change the frame size to one of 1 frame, ½ frame, ¼ frame, or ⅛ frame according to the information of the panel.

4. The organic light emitting diode display device according to claim 1, wherein the information of the panel includes a screen size, and wherein the controller is configured to set the frame size to the second frame when the screen size is a first size and set the frame size to the first frame when the screen size is a second size smaller than the first size.

5. The organic light emitting diode display device according to claim 1, wherein the image mode includes:

an image mode in which the frame size is fixed; and an image mode in which the frame size is variable.

6. The organic light emitting diode display device according to claim 5, wherein the image mode in which the frame size is variable includes a game mode.

7. The organic light emitting diode display device according to claim 1, wherein the controller is configured to set the frame size differently according to a type of the image mode.

8. The organic light emitting diode display device according to claim 1, wherein, when it is determined that an error has occurred in output image in a state in which the frame size is the first frame, the controller is configured to increase the frame size from the first frame to the second frame.

* * * * *